United States Patent [19]

Wang

[11] Patent Number: 5,203,560
[45] Date of Patent: Apr. 20, 1993

[54] PRODUCTION OF A SOUND-PRODUCING PU-BALL

[76] Inventor: Shyr-Yuh Wang, No. 44-3, Street Hwa-Fu, Chung-Ho, Taipei Hsien, Taiwan

[21] Appl. No.: 826,871

[22] Filed: Jan. 28, 1992

[51] Int. Cl.$^5$ ............................................. A63B 45/00
[52] U.S. Cl. ........................... 273/58 E; 273/58 G; 273/65 ED; 273/DIG. 8
[58] Field of Search ............... 273/58 R, 58 A, 58 E, 273/58 G, 65 ED, DIG. 8, 20, 213; 264/275, 277, 278

[56] References Cited

U.S. PATENT DOCUMENTS 3,350,252 10/1967 Twickler ..................... 273/DIG. 8
5,006,297 4/1991 Brown et al. ................. 273/DIG. 8
5,054,778 10/1991 Maleyko ........................ 273/58 G
5,066,011 11/1991 Dykstra et al. ............... 273/58 G

*Primary Examiner*—V. Millin
*Assistant Examiner*—Steven B. Wong
*Attorney, Agent, or Firm*—Bacon & Thomas

[57] ABSTRACT

The production of a sound-producing polyurethane foamed ball is disclosed in which the sound producing hardware having a sound generating circuit connected to a battery set by a spring switch, is placed in a mold for producing a polyurethane foam ball in which the polyurethane covers the sound generator through a foaming process. The sound generating hardware is supported in the mold by a metal column extending into the mold cavity. The polyurethane ball thus made has an elongated sound hole for transmitting sounds from said sound generator to the outside.

2 Claims, 4 Drawing Sheets

PRODUCTION OF A SOUND-PRODUCING PU-BALL

BACKGROUND OF THE INVENTION

The present invention relates to the production of sound-producing polyurethane balls and relates more particularly to the production of a ball made from polyurethane through a foaming process with an audible sound-producing means fastened therein for producing sounds upon playing with the ball.

Several rubber and plastic materials are known to be suitable for use in making toy balls. In using a foamed polyurethane for the production of a toy ball, it is difficult to arrange a sound generator inside the toy ball. If a sound generator is fastened inside a toy ball, a sound hole must be provided for transmitting sounds to the outside. The present invention has been accomplished to provide a polyurethane ball with a sound generating means. In the production of a polyurethane ball according to the present invention, a column is fastened in the mold to block the sound hole on an extended socket of a speaker of a sound generating circuit. After the foaming process, an elongated hole is formed in the polyurethane ball thus obtained for transmitting sounds from the speaker to the outside. A spring switch is used in controlling the operation of the sound generating circuit so as to minimize the consumption of electric power.

DETAILED DESCRIPTION OF THE PREFERRED EMBODIMENT

Figure 1:
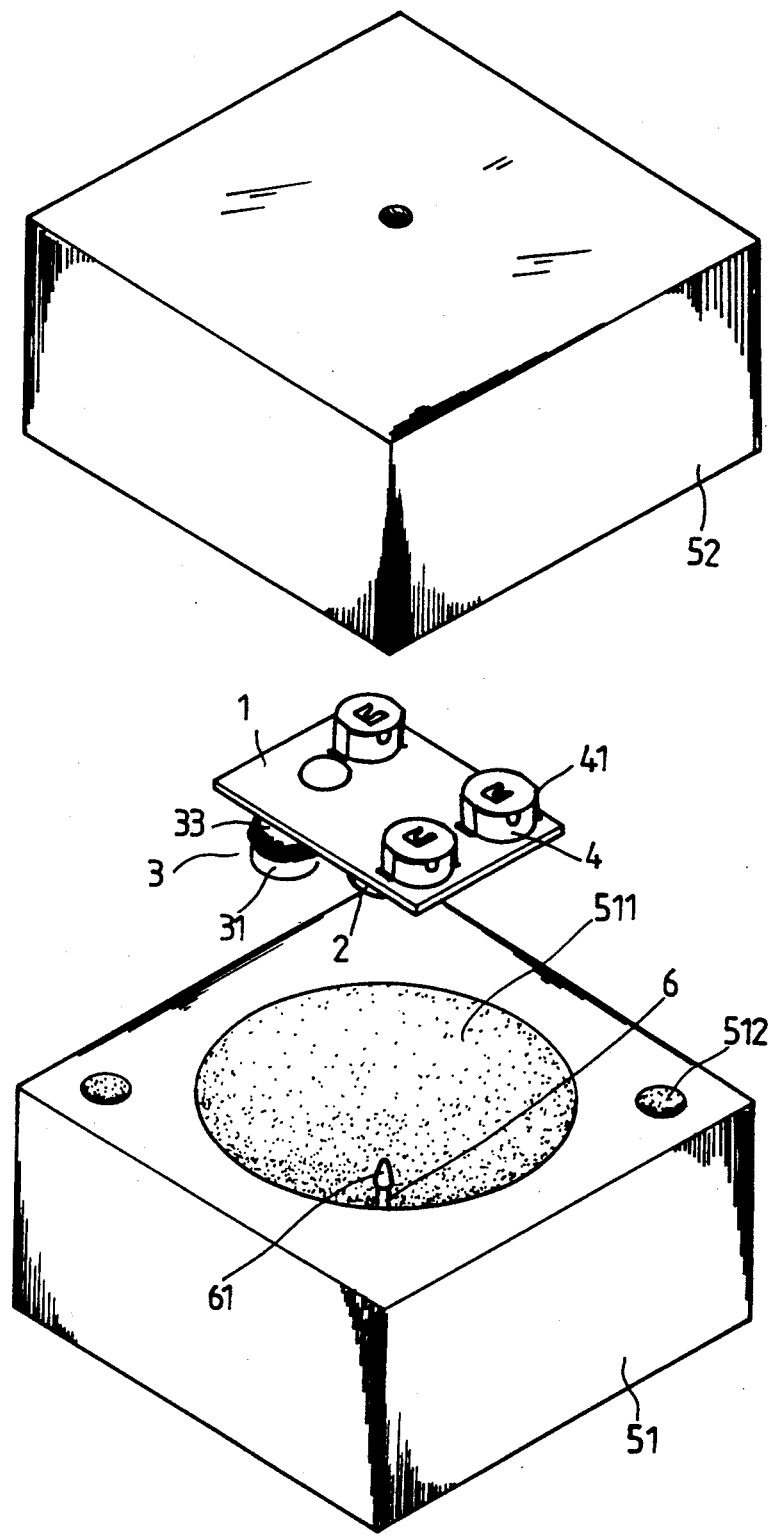
FIG. 1 is an exploded perspective view of the preferred embodiment of the present invention.
Figure 2:
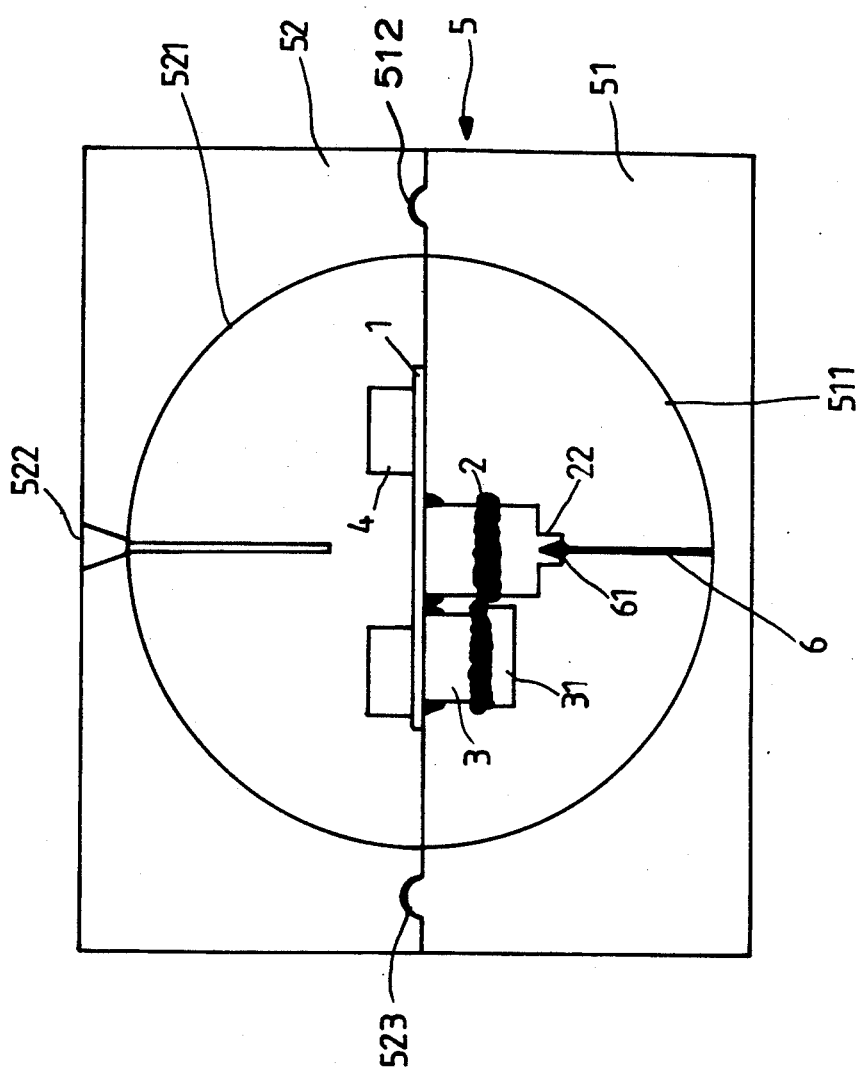
FIG. 2 is a sectional assembly view thereof before the foaming process.
Figure 3:
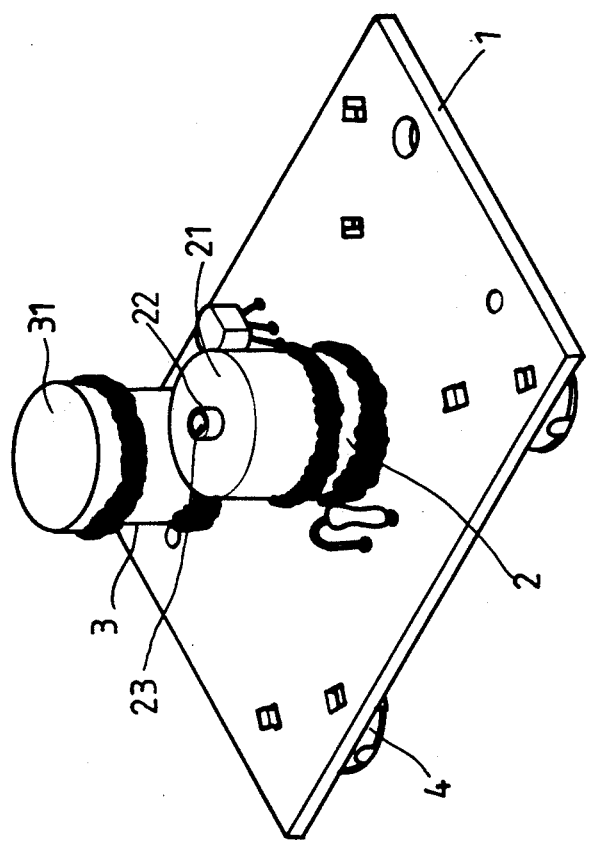
FIG. 3 is a perspective view of a sound-producing means according to the present invention showing that the component parts thereof are sealed by thermoplastic material.

Referring to FIGS. 1, 2, and 3, the hardware of the present invention comprises a circuit board 1 which is printed with an electronic circuit and has a music integrated circuit (not shown), a speaker 2, a spring switch 3 and a battery set 4 respectively connected to the electronic circuit, a mold 5, and a metal column 6. The speaker 2 is covered with an extended socket 21 having a circular flange 22 raising from a top edge thereof at the center defining a sound hole 23 through its central axis. The spring switch 3 has one end connected to a spring 32 and an opposite end connected to a metal covering 31. The space between the spring 32 and the metal covering 31 is extended so that the spring switch 3 can be electrically connected only when it bears a strong vibration force. The battery set 4 is comprised of three dry battery cells respectively secured to the circuit board 1 by retaining clamps 41. The mold 5 is comprised of a lower mold 51 and an upper mold 52. The lower mold 51 comprises a half round cavity 511 and two opposite raised portions 512 on its top edge. The upper mold 52 comprises a half round cavity 521 and two opposite recessed portions 523 on its bottom edge at locations and in sizes corresponding to the half round cavity 511 and the two opposite raised portions 512 on the lower mold 51, and a feed hole 522 on its top edge for filling polyurethane fluid into the half round cavity 521. By inserting the two opposite raised portions 512 in the two opposite recessed portions 523, the upper mold 52 is secured to the lower mold 51 firmly. The metal column 6 is vertically fastened inside the lower mold 512, having a cone head 61 at one end projecting into the round half cavity 511.

Figure 4:
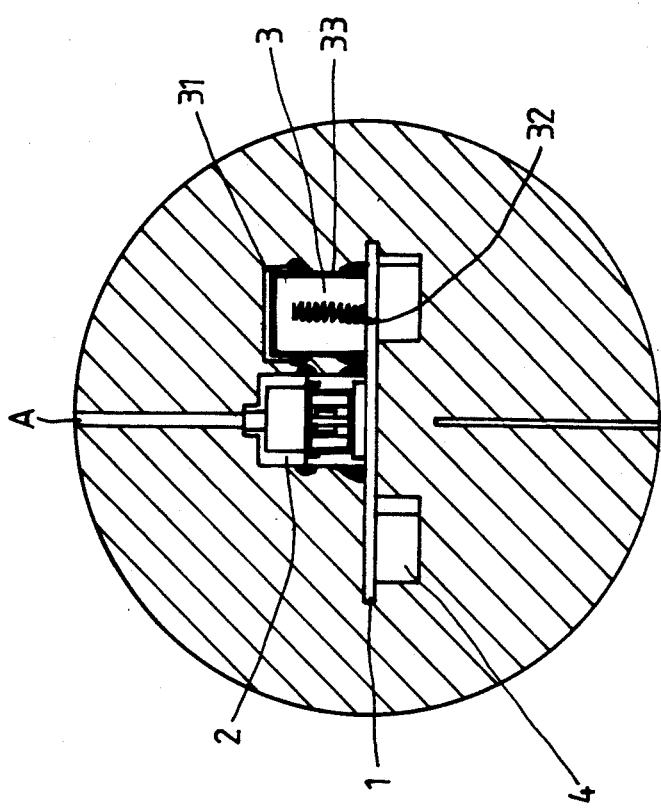
FIG. 4 is a cross section of a sound-producing ball made according to the present invention.

Referring to FIGS. 2 and 4 and seeing FIG. 3 again, the lower part of the speaker 2, the bottom of the spring switch 3 and the area around the metal shield 33 are sealed with thermoplastic material to prevent entry of the polyurethane foam. Once the battery set 4 has been secured in place by the retaining clamps 41, the circuit board 1 is placed in the half round cavity 511 of the lower mold 51 and supported on the metal column 6 by inserting the cone head 61 in the circular flange 22 of the socket 21 so as to block up the sound hole 23 (see FIG. 2). Then, the upper mold 52 is attached to the lower mold 51, and liquefied polyurethane is filled through the feed hole 522 into the half round cavities 521, 511. After the process of foaming, a polyurethane ball is formed and removed from the metal column 6. The ball thus obtained has an elongated hole A connecting the sound hole 23 to the outside (see FIG. 4). Once the polyurethane ball is hit against the ground or an object, the spring switch 3 is triggered to turn on the music IC of the circuit board 1 causing it to produce a sound. Because the electronic circuit on the circuit board 1 operates only when the ball is hit by force, electric power consumption can be minimized.

I claim:

1. A method of making a sound producing polyurethane ball in a mold comprising the steps of:
   a) extending a rod member from the mold into a mold cavity,
   b) removably supporting a sound generator on the rod member such that the sound generator is out of contact with the mold, said sound generator having a music integrated circuit, a speaker, a spring, and a battery set mounted thereon,
   c) placing a foamable polyurethane material into the mold cavity and causing the polyurethane material to undergo a foaming process such that the polyurethane material encloses the sound generator; and,
   d) removing the ball from the mold and withdrawing the rod member from the ball so as to leave a passage extending through the ball to the sound generator.

2. The method according to claim 1 further comprising the steps of:
   a) providing a speaker cover over the speaker, the speaker cover defining a sound hole therethrough and an annular flange extending around the sound hole; and,
   b) removably supporting the sound generator in the mold cavity by inserting the rod member into the sound hole in the speaker cover.

* * * * *